United States Patent
Harley et al.

(10) Patent No.: US 10,236,981 B2
(45) Date of Patent: *Mar. 19, 2019

(54) ADJUSTMENT OF CONTROL PARAMETERS OF SECTION OF OPTICAL FIBER NETWORK

(71) Applicants: James Harley, Nepean (CA); Kim B. Roberts, Ottawa (CA); David Boertjes, Nepean (CA)

(72) Inventors: James Harley, Nepean (CA); Kim B. Roberts, Ottawa (CA); David Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/648,895

(22) Filed: Jul. 13, 2017

(65) Prior Publication Data

US 2018/0343059 A1 Nov. 29, 2018

Related U.S. Application Data

(63) Continuation of application No. 15/603,810, filed on May 24, 2017.

(51) Int. Cl.
*H04B 10/294* (2013.01)
*H04B 10/25* (2013.01)
*H04B 10/079* (2013.01)
*H04B 10/27* (2013.01)
*H04J 14/02* (2006.01)

(52) U.S. Cl.
CPC ... *H04B 10/2504* (2013.01); *H04B 10/07955* (2013.01); *H04B 10/27* (2013.01); *H04J 14/0221* (2013.01); *H04J 14/0275* (2013.01)

(58) Field of Classification Search
CPC .................................................. H04B 10/294
See application file for complete search history.

(56) References Cited

U.S. PATENT DOCUMENTS

| | | | |
|---|---|---|---|
| 5,513,029 A | 4/1996 | Roberts | |
| 5,969,840 A | 10/1999 | Roberts | |
| 6,031,647 A | 2/2000 | Roberts | |
| 6,064,501 A | 5/2000 | Roberts et al. | |
| 6,072,614 A | 6/2000 | Roberts | |
| 6,128,111 A | 10/2000 | Roberts | |
| 6,229,631 B1 * | 5/2001 | Sato ................... | H04B 10/0775 398/147 |
| 6,411,417 B1 | 6/2002 | Roberts et al. | |

(Continued)

OTHER PUBLICATIONS

Poggiolini, "The GN Model of Non-Linear Propagation in Uncompensated Coherent Optical Systems", Journal of Lightwave Techonology, vol. 30, No. 24, Dec. 15, 2012.

(Continued)

*Primary Examiner* — Shi K Li
(74) *Attorney, Agent, or Firm* — Integral Intellectual Property Inc.; Miriam Paton; Amy Scouten

(57) ABSTRACT

A processor of an apparatus is configured to apply one or more control algorithms using estimated data to adjust the one or more control parameters of a section of an optical fiber network. The estimated data are derived from measurements of optical signals in the section and from knowledge of the section. The estimated data is a function of optical nonlinearity and of amplified spontaneous emission.

18 Claims, 3 Drawing Sheets

(56) References Cited

U.S. PATENT DOCUMENTS

| | | |
|---|---|---|
| 6,687,464 B1 | 2/2004 | Roberts et al. |
| 6,839,523 B1 | 1/2005 | Roberts |
| 7,356,256 B1 | 4/2008 | Stawczynski et al. |
| 7,376,358 B2 | 5/2008 | Roberts et al. |
| 7,457,538 B2 | 11/2008 | Strawczynski et al. |
| 7,894,721 B2 | 2/2011 | Roberts et al. |
| 8,095,008 B2 | 1/2012 | Collings et al. |
| 8,098,988 B2 | 1/2012 | Nakazato et al. |
| 8,364,036 B2 | 1/2013 | Boertjes et al. |
| 8,594,499 B1 | 11/2013 | Roberts et al. |
| 8,781,317 B1 | 7/2014 | Roberts |
| 9,042,739 B2 | 5/2015 | Sekiya |
| 9,083,458 B2 | 7/2015 | Piciaccia et al. |
| 9,438,369 B2 | 9/2016 | Swinkels et al. |
| 2003/0169998 A1 | 9/2003 | Premaratne et al. |
| 2004/0120706 A1* | 6/2004 | Johnson ............ H04B 10/07 398/10 |
| 2008/0267631 A1* | 10/2008 | Collings ............ H04J 14/0205 398/97 |
| 2009/0297149 A1* | 12/2009 | Nakazato ............ G02B 6/2931 398/79 |
| 2010/0220998 A1* | 9/2010 | Sekiya ............ H04B 10/291 398/34 |
| 2013/0236169 A1 | 9/2013 | Gaudette et al. |
| 2014/0112660 A1* | 4/2014 | Al Sayeed ............ H04J 14/0221 398/38 |
| 2015/0016819 A1* | 1/2015 | Piciaccia ............ H04B 10/0793 398/37 |
| 2015/0304033 A1 | 10/2015 | Giorgi et al. |
| 2015/0333824 A1 | 11/2015 | Swinkels et al. |
| 2016/0315711 A1 | 10/2016 | Al Sayeed et al. |
| 2017/0237485 A1 | 8/2017 | Wood et al. |
| 2018/0006733 A1 | 1/2018 | Tourgee et al. |

OTHER PUBLICATIONS

Poggiolini, et al., "The GN Model of Fiber Non-Linear Propagation and its Applications", Journal of Lightwave Technology, vol. 32, No. 4, Feb. 14, 2014.

Poggiolini, et al., "The LOGON Strategy for Low-Complexity Control Plane Implementation in New-Generation Flexible Networks" OFC/NFOEC Technical Digest 2013.

Roberts, et al., "Convex Channel Power Optimization in Nonlinear WDM Systems using Gaussian Noise Model", Journal of Lightwave Technology, vol. 34, No. 13, Jul. 1, 2016.

Pending U.S. Appl. No. 15/648,895, filed Jul. 13, 2017.

Li, First Office Action for U.S. Appl. No. 15/603,810, dated May 8, 2018.

Pending U.S. Appl. No. 15/796,393, filed Oct. 27, 2017.

Li, Second Office Action for U.S. Appl. No. 15/603,810, dated Sep. 10, 2018.

Li, First Office Action for U.S. Appl. No. 15/796,393, dated Jul. 26, 2018.

Li, Notice of Allowance for U.S. Appl. No. 15,603,810, dated Oct. 3, 2018.

Lobato Polo, "International Search Report for PCT/IB2018/052376", dated Sep. 25, 2018.

Lobato Polo, "Written Opinion of ISA for PCT/IB2018/052376", dated Sep. 25, 2018.

Li, "Second Office Action for U.S. Appl. No. 15/796,393", dated Jan. 4, 2019.

* cited by examiner

ADJUSTMENT OF CONTROL PARAMETERS OF SECTION OF OPTICAL FIBER NETWORK

TECHNICAL FIELD

This document relates to the technical field of optical communications and specifically to the control of components in an optical fiber network.

BACKGROUND

Current best practices for determining optical parameters in an optical fiber network look at equalizing the ratio of amplified spontaneous emission (ASE) to signal power on channels over an optical section while respecting channel power limits to manage the fiber optical nonlinear effects. This equalization addresses the strong power tilt that can accumulate across spans of optical fiber mainly due to Stimulated Raman Scattering (SRS). These methods rely heavily on offline simulations to determine good control parameters, such as peak power. This is operationally burdensome and error prone.

U.S. Pat. No. 9,438,369 describes increasing capacity by optimization after nonlinear modeling. U.S. Pat. No. 8,364,036 describes controlling optical power within domains, and exchanging state information between domains. U.S. Pat. No. 8,781,317 describes methods to measure phase nonlinearities. U.S. Pat. No. 7,894,721 describes global optical control where receiver changes are correlated to network perturbations. U.S. Pat. No. 7,457,538 describes performance monitoring using the analog-to-digital converter of the receiver. U.S. Pat. No. 7,376,358 describes location-specific monitoring of nonlinearities. U.S. Pat. No. 7,356,256 describes digital monitoring along the optical line. US Patent Publication No. 2016/0315711 describes controlling the optical spectral density in a section.

SUMMARY

Through the latest innovations, optical networks are capable of dynamically changing optical paths, and flexible transceivers are capable of changing modulation formats and other transmission parameters. In this environment, optical line control that provides good performance, scalability, and self-optimization is desirable.

Adjustment of one or more control parameters of a section of an optical fiber network involves taking measurements of optical signals in the section, deriving estimated data from the measurements and from knowledge of the section, where the estimated data is a function of optical nonlinearity and of amplified spontaneous emission, and applying one or more control algorithms using the estimated data to adjust the one or more control parameters.

DETAILED DESCRIPTION

Optical network topologies can range from simple unamplified point-to-point, to branching chains of reconfigurable optical add drop multiplexer (ROADM) sections, up to a full multi-connected mesh that spans a continent.

In wavelength division multiplexing (WDM) systems, an optical fiber network connects wavelength selective switch (WSS) nodes via spans of optical fibers and optical amplifier devices. Pairs of flexible coherent transceivers are connected over paths through the optical fiber network. Different channels are propagated through different paths in the network. A flexible coherent transceiver can be reconfigured allowing transmission parameters, for example, modulation scheme, to be adapted to the selected path.

Some elements of the optical fiber network have the ability to do some level of per-channel power control. Such elements may include, for example, the transmitter portions of the flexible coherent transceivers, a variable optical attenuator (VOA) under software control, and optical equalizers. In another example, per-channel power is controllable by provisioning a wavelength selective switch (WSS) node with loss values. A WSS node has switching capabilities and per-channel power control.

Some elements of the optical fiber network have the ability to do some level of total power control. Such elements may include, for example, optical amplifier devices. For example, the gain of an optical amplifier device is controllable by provisioning the optical amplifier device with a target gain. Equivalently, the total output power (TOP) of an optical amplifier device is controllable by provisioning the optical amplifier device with a target total output power.

Some optical amplifier devices also have the ability to do some level of per-channel power control, by provisioning the optical amplifier device with a target gain tilt profile. For simplicity, this document focuses on the following control parameters of a section of an optical fiber network: the loss values of a WSS node, which affect the launch powers of the signals launched into the optical fibers, and the target gain values (or target TOP values) of optical amplifier devices.

Figure 1:
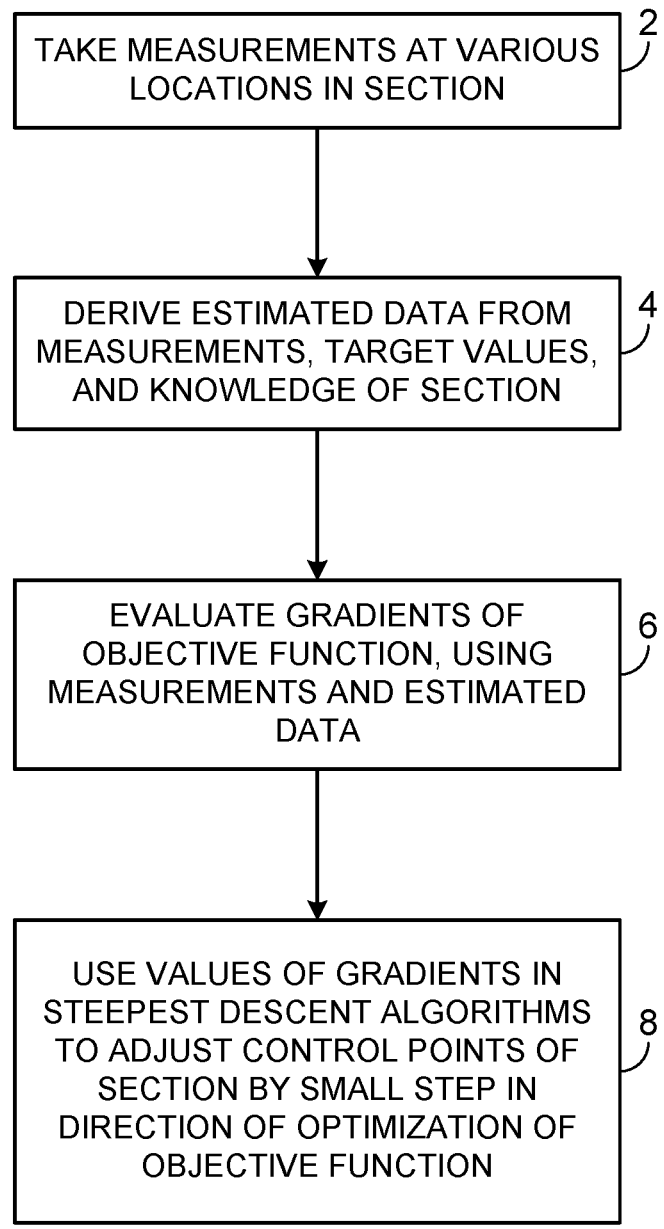
FIG. 1 illustrates a method for adjustment of control parameters in section of an optical fiber network.

FIG. 1 is a flowchart illustration of a method for adjustment of control parameters in a section of an optical fiber network. A section may comprise most or all of the optical fiber network. If the optical fiber network is small, the section may indeed comprise all of the network. However, it is generally advantageous for the method to control a single point-to-point section of optical amplifier devices and spans of optical fiber between two nodes that contain ROADM, WS S, or other switching hardware that may be present.

At 2, measurements of optical signals are taken at various locations in the section. The measurements may include per-channel optical power (also referred to as power spectral density, especially in a flexible grid system) and total output power. For example, an optical power monitor (OPM) device is able to measure per-channel optical power by switching the optical connection to its input. Due to the cost of an OPM device, there is generally not an OPM device at each optical amplifier device. Taps and photodiodes may be placed, for example, at the input and at the output of the optical amplifier devices. Each photodiode is operative to measure the total optical power at the location of the tap. At locations where there is an OPM device and a tap and photodiode, the measurement of total optical power may be used to calibrate the per-channel optical power measured by the OPM device.

At 4, estimated data is derived from the measurements, from the target values, and from knowledge of the section and its components. The estimated data may include, for example, the estimated per-channel optical power at the output of the optical amplifier devices, the estimated incremental amplified spontaneous emission (ASE) power introduced by the optical amplifier devices, and the estimated self-phase modulation (SPM) and cross-phase modulation (XPM) variance accumulated in the section. The estimated data may be derived using a modeling engine that models the propagation of signals through the components of the section. Alternatively, the estimation of nonlinearities and noise may be derived from specific measurements of parameters as described in U.S. Pat. Nos. 8,594,499, 7,356,256, 6,128,111, 6,687,464, 6,839,523, 7,376,358, 6,072,614, 6,064,501, and 5,513,029.

The estimated data is then used in a control algorithm to adjust the control parameters. Various control algorithms are contemplated. For example, the control algorithm may make use of gradients and slew-rate limited steepest descent. At 6, gradients of an objective function are evaluated, using the measurements and the estimated data. The values of the gradients are inaccurate, for at least the reason that the measurements are noisy, the knowledge of the section and its components may be inaccurate or incomplete, the modeling engine is inaccurate, and the estimated data is inaccurate. Some of the channels propagated through the section carry live traffic. That is, some of the channels are in-service channels carrying traffic for customers. It is therefore important not to adjust the components of the section in a manner that would jeopardize or degrade or destabilize the in-service channels.

At 8, the values of the gradients are used in steepest descent algorithms to adjust control parameters of the section by a small step in a direction of optimization of the objective function. That is, small adjustments are applied to target values such as loss values of a WSS node and the target gain (or target total output power) of an optical amplifier device. Steepest descent algorithms are known to be noise tolerant and to be very safe if small steps are taken. The values of some control parameters that are adjusted may be set points for algorithms that control other control parameters. For example, a value of a per-channel optical power out of a WSS node may be a set point for an algorithm that adjusts the loss of the relevant pixels of that WSS node. A total power may be a set point for an algorithm that adjusts total gain, which may be a set point for a digital control loop which adjusts a VOA loss and pump currents. A pump current may be a set point for an analog loop which adjusts a Field Effect Transistor (FET) bias.

The method illustrated in FIG. 1 may be repeated over the lifetime of use of the optical fiber network. For example, the method may be repeated every few seconds for 25 years. It is not necessary that all control parameters be adjusted in each iteration of the method. Various changes occur over time, yielding updated measurement data, updated estimated data, updated values for the gradients, an updated direction of optimization of the objective function, and updated adjustments to the control parameters.

The optical fiber network may be partitioned into sections arbitrarily. For simplicity, this document focuses on an example section that enables transmission of a set of optical signals along a particular transmission direction from a first WSS node to a second WSS node. (Signals are also directed along the opposite transmission direction, where the roles of ingress and egress are reversed. However, so as not to obscure the description of the technology, transmission along that opposite direction is not illustrated and is not discussed in this document.)

Figure 2:
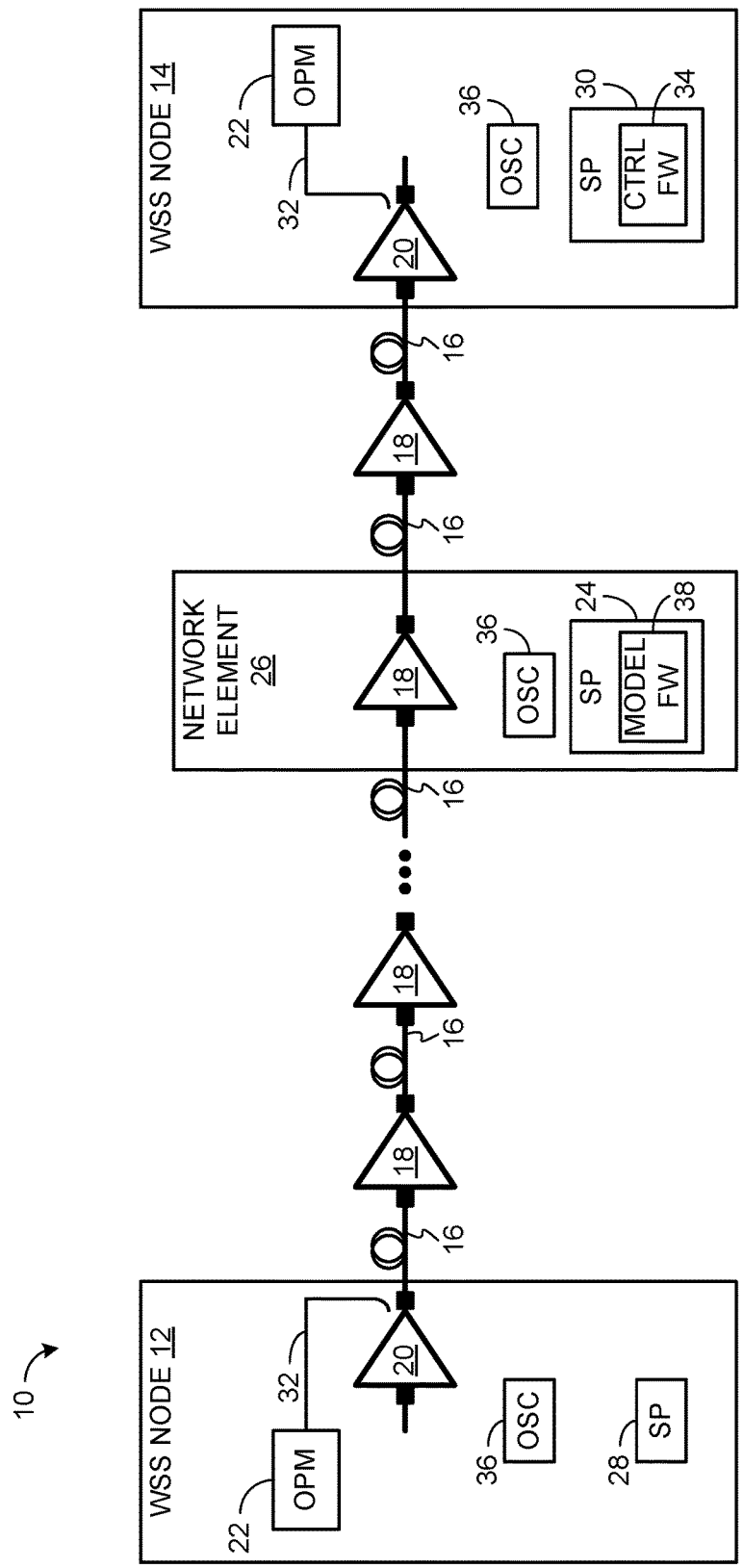
FIG. 2 illustrates an example section of an optical fiber network.

FIG. 2 illustrates an example section 10 of an optical fiber network. An ingress WSS node 12 is connected to an egress WSS node 14 via spans 16 of optical fiber. The length of a span 16 of optical fiber is typically in the range of approximately 80 km to approximately 100 km. The spans 16 of optical fiber are coupled via optical amplifier devices 18. An optical pre-amplifier device 20 in the ingress WSS node 12 is optically coupled to the first span 16 of optical fiber. An optical pre-amplifier device 20 in the egress WSS node 14 is optically coupled to the final span 16 of optical fiber. One can index the spans 16 and the optical (pre-)amplifier devices 18,20 by an index j, with N representing the total number of spans of optical fiber coupling the ingress WSS node 12 to the egress WSS node 14. For example, one can refer to the optical pre-amplifier device 20 in the ingress WSS node 12 as the first optical amplifier device, whose output is launched into the first span of optical fiber. Similarly, the output of the optical amplifier device j is launched into the span j of optical fiber.

As discussed above, the measurements taken at various locations in the section may include per-channel optical power (also referred to as power spectral density, especially in a flexible grid system) measured by OPM devices and total output power measured by photodiodes. In the example section 10, OPM devices 22 at the ingress WSS node 12 and at the egress WSS node 14 are able to measure per-channel optical power across the spectrum at the output of the respective optical pre-amplifier device 20. In the example section 10, taps and photodiodes are present at the input and at the output of each optical (pre-)amplifier device 18,20 and are illustrated in FIG. 2 by small black squares. Each optical amplifier device 18 is comprised, together with its respective taps and photodiodes and together with a shelf processor 24, in a network element 26. For simplicity, only one such network element 26 is illustrated in FIG. 2. There is a shelf processor 28 comprised in the ingress WSS node 12 and a shelf processor 30 comprised in the egress WSS node 14.

Each photodiode is operative to measure the total optical power at the location of its respective tap. At the output of the optical amplifier device j, the photodiode measures the total output power, which includes both optical signal power and ASE power. The per-channel power measured by the OPM device 22 is reliable only in terms of relative power across the spectrum, because the loss along a cable 32 coupling the output of the optical pre-amplifier device 20 to the OPM device 22 is generally not known. The total output power measured by the photodiode at the output of the optical pre-amplifier device 20 in the ingress WSS node 12 can be used to calibrate the per-channel optical power measured by the OPM device 22, thus yielding a calibrated set of per-channel optical power measurements $\{P_1[i]\}$, where $P_1[i]$ is the power of the channel i launched into the first span of optical fiber. The total output power measured by the photodiode at the output of the optical pre-amplifier device 20 in the egress WSS node 14 can be used to calibrate the per-channel optical power measured by the OPM device 22, thus yielding a calibrated set of per-channel optical power measurements $\{P_{N+1}[i]\}$, where $P_{N+1}[i]$ is the power of the channel i output from the optical pre-amplifier device 20 in the egress WSS node 14. The integration of per-channel optical power measurements to yield an aggregate power, comparison of the aggregate power to the measured total optical power, and calibration may be performed by firmware (not shown) in the WSS node 12,14. Alternatively, the integration, comparison and calibration may be performed by any other suitable firmware executed by a processor within the example section 10. Conventional optical power units are dBm. In this document, the per-channel optical power measurements $\{P_j[i]\}$ are conveniently measured in units of Nepers relative to a Watt, because it is more convenient for the calculus of equations appearing hereinbelow.

A control system embedded in the section is operative to provision certain components of the section with specific target values. For example, the control system is operative to provision the ingress WSS node 12 with loss values, and to provision the optical amplifier devices 18 and the optical pre-amplifier devices 20 with respective target gain values or target TOP values. The control system comprises, for example, hardware (not shown) located in the ingress WSS node 12, hardware (not shown) located in the optical amplifier devices 18 and in the optical pre-amplifier devices 20, and control firmware 34 executed by any one of the shelf processors within the section 10, for example, the shelf processor 30 comprised in the egress WSS node 14. The control firmware 34 is stored in non-transitory computer-readable media coupled to the shelf processor.

In an alternative implementation, the control firmware 34 is executed by an external processor (not shown) that is in communication with the controllable elements of the section. The external processor may be located in a physical server or may be virtualized as part of a cloud infrastructure. The apparatus in which the external processor is located may also store the control firmware 34 in non-transitory computer-readable media that is accessible by the external processor.

As discussed above, estimated data is derived from the measurements, from the target values, and from knowledge of the section and its components. The estimated data may be derived using a modeling engine that models the propagation of signals through the components of the section.

The knowledge of the section and its components may include "known characteristics". Manufacturers and/or distributors of the components may provide some of the known characteristics. Other known characteristics may be determined by testing and/or calibrating the components. Still other known characteristics may be provided by inspection of the section. The known characteristics may include, for example, the topology of the section, one or more optical amplifier characteristics such as amplifier type (e.g. Erbium-doped fiber amplifier (EDFA), distributed Raman amplifier, lumped Raman amplifier), noise figure, ripple, spectral hole burning, and Total Output Power (TOP) limit, and one or more optical fiber characteristics such as fiber type, span length, nonlinear coefficients, effective area, loss coefficients, total loss, chromatic dispersion, and Stimulated Raman Scattering (SRS).

Measured data (raw and/or calibrated), control data, and (optionally) known characteristics, are communicated within the section 10 over an optical service channel (OSC), also known as an optical supervisory channel. The WSS nodes 12,14 and the network elements 26 each comprise circuitry 36 to support the OSC.

The modeling engine models the propagation of signals through components of the section. Specifically, the modeling engine employs fiber models for the spans 16 of optical fiber in the section 10 and employs amplifier models for the optical (pre-)amplifier devices 18,20. Modeling firmware 38 that uses the modeling engine is executed by any one of the shelf processors within the section 10, for example, the shelf processor 24 comprised in the network element 26. The estimated data derived by the modeling engine may include, for example, the estimated per-channel optical power $\{P_j[i]\}$ at the output of the optical amplifier j, where $P_j[i]$ is the power, measured in units of Nepers, of the channel i launched into the span j of optical fiber, and the estimated incremental ASE power $\{ASE_j[i]\}$ at the output of the optical amplifier j. The modeling engine may employ known techniques to derive the power evolution of the optical signals through the section and to derive the incremental ASE power.

The accuracy of the estimated per-channel optical power at each of the fiber interfaces is important. Stimulated Raman Scattering (SRS) may impart in the range of approximately 1 dB to approximately 2 dB power tilt across the C band (1525 nm to 1565 nm) and in the range of approximately 3 dB to approximately 4 dB power tilt across the L band (1565 nm to 1610 nm). These power tilts may accumulate between spans where there is no WSS node to equalize the tilts. Channels at different optical powers experience very different optical degradation in terms of ASE (at low channel power) and optical nonlinearities (at high channel power). Good modeling of the SRS tilt per span of optical fiber is part of what contributes to accurate estimated per-channel optical powers and accurate estimated incremental ASE powers.

Once the estimated per-channel optical powers are of sufficient accuracy (which could be determined, for example, by comparing the estimated per-channel optical powers for the output of the optical pre-amplifier device 20 in the egress WSS node 14 with the calibrated set of per-channel optical power measurements $\{P_{N+1}[i]\}$), the modeling engine may derive the estimated self-phase modulation (SPM) and cross-phase modulation (XPM) variance accumulated in the section 10. The estimated data is thus a function of optical nonlinearity and of ASE.

The modeling engine may model nonlinear interactions within the spans 16 of optical fiber as Gaussian noise, as described in P. Poggiolini, "The GN Model of Non-Linear Propagation in Uncompensated Coherent Optical Systems", Journal of Lightwave Technology, Vol. 30, No. 24, Dec. 15, 2012; P. Poggiolini et al. "The GN Model of Fiber Non-Linear Propagation and its Applications", Journal of Lightwave Technology, Vol. 32, No. 4, Feb. 14, 2014. Alternatively, the modeling engine may employ a different model of the nonlinear interactions, for example, full non-linear Schrodinger Equation solutions using Fast Fourier transform (FFT) or finite difference methods.

As described above, gradients of an objective function are evaluated, using the measurements and the estimated data.

In one aspect, the goal of the objective function is to minimize the total degradation through the section. Optimization of this objective function minimizes a weighted sum of ratios of the total noise power from ASE and optical nonlinearities to the power of the optical signals. This objective function is suitable for systems where there is no software connection to convey information from the receiver modem to the section.

An example objective function $V_1$ for a section, with the goal of minimizing the total degradation through the section, is given in Equations (1) and (2):

$$V_1 = \sum_{i=1}^{N_{CH}} C[i] LNSR[i] = \sum_{i=1}^{N_{CH}} \sum_{j=1}^{N} C[i] LNSR_j[i] \quad (1)$$

$$LNSR_j[i] = \frac{ASE_j[i]}{e^{P_j[i]}} + \sum_{k=1}^{N_{CH}} NL_j[i,k] e^{2P_j[k]} \quad (2)$$

In Equation (1), LNSR [i] denotes the incremental line noise-to-signal ratio (NSR) for the channel i in the section, which can be expressed as a weighted sum over spans j of optical fiber of the incremental line NSR for the channel i in the span j, denoted $LNSR_j[i]$. $C[i]$ is a weighting value for the channel i to optionally bias the objective function for particular higher-value signals. $N_{CH}$ denotes the number of channels in the signals in the section, and N denotes the number of spans j of optical fiber in the section. $C[i]$ may be a customer-defined weighting value. Alternatively, $C[i]$ may be defined in a different manner. For example, when $C[i]$=Baudrate [i] the objective function $V_1$ will converge to control parameters that maximize the capacity-bandwidth product in the optical fiber network. In another example, when $C[i]$=Baudrate$[i]\times$SNR$[i]$ where SNR$[i]$ is an estimate of the signal-to-noise ratio (SNR) in linear units at the receiver modem whose channel i traverses the section, the objective function $V_1$ will converge to control parameters that maximize the capacity of the optical fiber network.

In Equation (2), $P_j[i]$ is the power of the channel i at the output of the optical amplifier j, which is launched into the optical fiber of the span j, $ASE_j[i]$ is the incremental ASE power on the channel i at the output of the optical amplifier j, and $NL_j[i, k]$ is the SPM/XPM nonlinear coefficient for Kerr interactions between the channel i and the channel k at the span j. The power $P_j[i]$ is measured in units of Nepers relative to a Watt. The second term in Equation (2) is a summation over all channel powers that impact the LNSR of the channel i at the span j. Where nonlinear interactions in one span are independent of nonlinear interactions in another span, the local optimum of this objective function $V_1$ is the global optimum. The paper I. Roberts, J. M. Kahn, D. Boertjes, "Convex Channel Power Optimization in Nonlinear WDM Systems using Gaussian Noise Model", Journal of Lightwave Technology, Vol. 34, No. 13, Jul. 1, 2016 proves that the second term in Equation (2) is a convex function in the power $P_j[i]$ when assuming a Gaussian noise nonlinearity model.

The following discussion derives the gradients of the example objective function $V_1$, which are evaluated to provide a direction for adjustment of control parameters. A gradient vector $\nabla V_{1j}$ for control of the ingress WSS node 12 is derived. A gain gradient for TOP control of the optical amplifier devices 18 is derived.

The example objective function $V_1$ given in Equation (1) can be expressed as the sum over all spans j in the section of an example span objective function $V_{1j}$, which is given in Equation (3):

$$V_{1j} = \Sigma_{i=1}^{NCH} C[i] LNSR_j[i] \quad (3)$$

The partial derivative of the example span objective function $V_{1j}$ with respect to channel power for channel i in the span j of optical fiber is given by Equation (4):

$$\frac{\partial V_{1j}}{\partial P_j[i]} = \quad (4)$$

$$\sum_{k=1}^{N_{CH}} C[k] \frac{\partial LNSR_j[k]}{\partial P_j[i]} = -C[i] \frac{ASE_j[i]}{e^{P_j[i]}} + \sum_{k=1}^{N_{CH}} 2C[k] NL_j[i, k] e^{2P_j[i]}$$

where the channel power $P_j[i]$ is fixed and the sum is over XPM/SPM terms over all channels dependent on channel power $P_j[i]$.

A gradient vector $\nabla V_{1j}$ for a span j comprises the partial derivative $$\frac{\partial V_{1j}}{\partial P_j[i]}$$

for each channel i from 1 to $N_{CH}$. The partial derivative of the example objective function $V_1$ with respect to WSS loss for the channel k in the section is given by Equation (5):

$$\frac{\partial V_1}{\partial P[k]} = \quad (5)$$

$$\sum_{j=1}^{N} \frac{\partial V_{1j}}{\partial P_j[k]} = \sum_{j=1}^{N} \left[ -C[k] \frac{ASE_j[k]}{e^{P_j[k]}} + \sum_{i=1}^{N_{CH}} 2C[k] NL_j[i, k] e^{2P_j[i]} \right]$$

where $P[k]$ is the power of the channel k out of the ingress WSS node 12 which affects all spans in the section.

A gradient vector $\nabla V_1$ for the section comprises the partial derivative $\partial V_1/\partial P[k]$ for each channel k from 1 to $N_{CH}$. The gradient vector $\nabla V_1$ can be evaluated from the customer values $C[i]$, the known characteristics $NL_j[i, k]$, and the measured or estimated data $\{P_j[i]\}$ and $\{ASE_j[i]\}$.

The incremental ASE power on the channel i induced by the optical amplifier device j is given by the well known Equation (6):

$$ASE_j[i] = h*v*B_e(NF_j[i]*G_j[i]-1) \quad (6)$$

where h is Planck's constant, v is the optical frequency, $B_e$ is the electrical bandwidth of the noise filtering in the receiver, $NF_j[i]$ is the noise figure for the channel i of the optical amplifier device j, and $G_j[i]$ is the gain for the channel i of the optical amplifier device j.

The gradient of the ratio of the ASE power to the signal power term with respect to gain $G_j[i]$ is given by Equation (7):

$$\nabla_{G_j[i]} \left( \frac{ASE_j[i]}{e^{P_j[i]}} \right) \approx -\frac{h \cdot v \cdot NF_j[i] \cdot B_e}{e^{P_{j+1}^{IN}[i]}} \quad (7)$$

where $P_{j+1}^{IN}[i]$ is the channel power at the input to the next optical amplifier device. This gradient is approximately the negative of the ratio of the incremental ASE power to signal power of the next optical amplifier device.

The gain gradient for the optical amplifier device j, averaged over all wavelengths, can be formed as given by Equation (8):

$$\frac{\partial V_{1j}}{\partial G_j} = \sum_{k=1}^{N_{CH}} \left[ -C[k] \frac{ASE_{j+1}[k]}{e^{P_{j+1}[k]}} + \sum_{i=1}^{N_{CH}} 2C[i] NL_j[i, k] e^{2P_j[i]} \right] \quad (8)$$

The gain gradient for the optical amplifier device j, averaged over all wavelengths, can be evaluated from the customer values $C[i]$, the known characteristics $NL_j[i, k]$, and the measured or estimated data $\{P_j[i]\}$ and $\{ASE_j[i]\}$.

As described above, the values of the gradients are used in steepest descent algorithms to adjust control parameters of the section by a small step in a direction of optimization of the objective function.

Small adjustments are applied to loss values of a WSS node and to target TOP values of optical amplifier devices. The steepest descent algorithm is applied to the WSS node while assuming that the gains of the optical amplifier devices are fixed. The steepest descent algorithm is applied to all of the optical amplifier devices in parallel while assuming that the WSS pixel drive values are fixed.

For example, two loops may be run in parallel with a decoupling factor, as expressed in the vector Equation (9), Equation (10) and Equation (11):

$$\text{WSS\_PowerTarget}_{NEW} = \text{WSS\_PowerTarget} - \left(\frac{MAXSTEP}{\max(\nabla V_1)} * [\nabla V_1 - \text{mean}(\nabla V_1)]\right) \quad (9)$$

$$\text{TOP\_Target}_{NEW} = \text{TOP\_Target} - \text{sign}\left[\frac{\partial V_{1j}}{\partial G_j} * 0.1 * MAXSTEP\right] \quad (10)$$

$$\text{if TOP\_Target}_{NEW} \geq TOP_{LIMIT}, \text{ set TOP\_Target}_{NEW} = TOP_{LIMIT} \quad (11)$$

where WSS_PowerTarget$_{NEW}$ and WSS_PowerTarget have values for each channel k from 1 to $N_{CH}$, the decoupling factor in this example is 0.1, and the target TOP for the optical amplifier device j is subject to an upper limit. An example MAXSTEP is 0.2 dB.

TOP control is used to decouple incremental SNR optimization in this section from changes occurring in other sections of the optical fiber network. The subtraction of the change in average power (which is denoted mean($\nabla V_1$) in Equation (9) but is not quite equal to the average of the changes) keeps the WSS output power constant, and the power launched into the first span is controlled by the TOP of the first amplifier. This scaling is important when one or more of the amplifiers reaches the limit of their TOP and can provide no more power. With this scaling, the allocation of that limited power between the wavelengths is cleanly optimized.

Note also that there is no reliance on a second derivative for step size, and that this simple algorithm is robust to noise.

As mentioned above, where nonlinear interactions in one span are independent of nonlinear interactions in another span, the local optimum of this objective function $V_1$ is the global optimum. Operationally, this permits the adjustment of the control parameters for one section to be performed in parallel to the adjustment of the control parameters for other sections of the optical fiber network. For example, the two loops expressed in the vector Equation (9), Equation (10) and Equation (11) may be run in parallel independently for several sections of the optical fiber network.

In another aspect, the goal of the objective function is to maximize the capacity or the reliability or both of a network by allocating margin to channels that are at higher risk of failure at their designated capacities by taking away margin from channels with plenty of margin. This objective function is suitable for systems where, for at least some channels, there is a software connection to convey information to the section (or to the external processor) from the receiver modem that receives that channel. This objective function can also be used protect channels in service while trialing a new channel to see if it can sustain a particular high capacity. Another value of this objective function is to assist channels that are experiencing a slow low-probability degradation event such as polarization dependent loss (PDL) by improving this weakened channel's line SNR at the expense of other channels that have higher margin.

Figure 3:
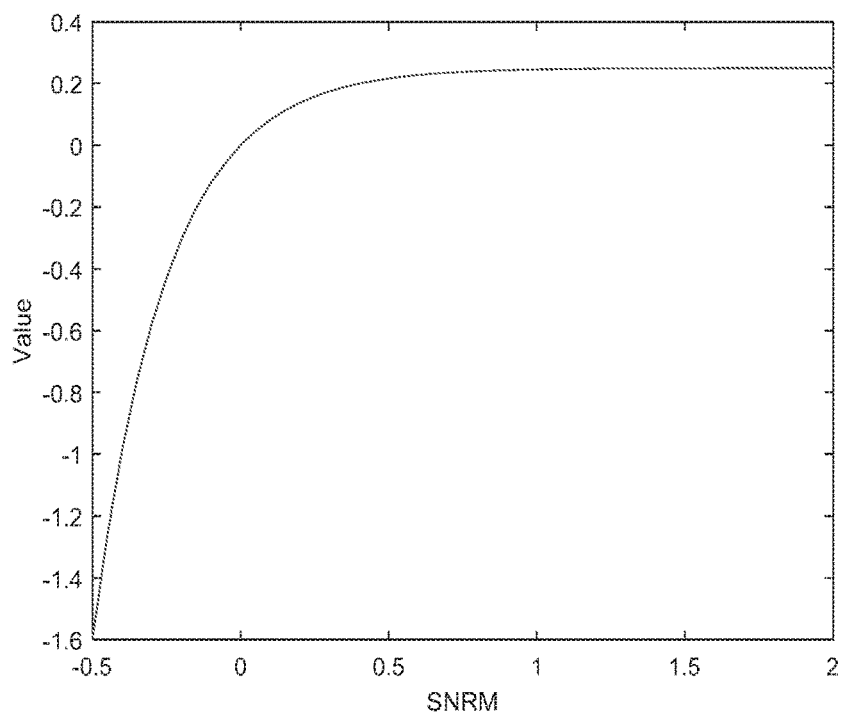
FIG. 3 illustrates an example concave value function of excess margin.
Figure 4:
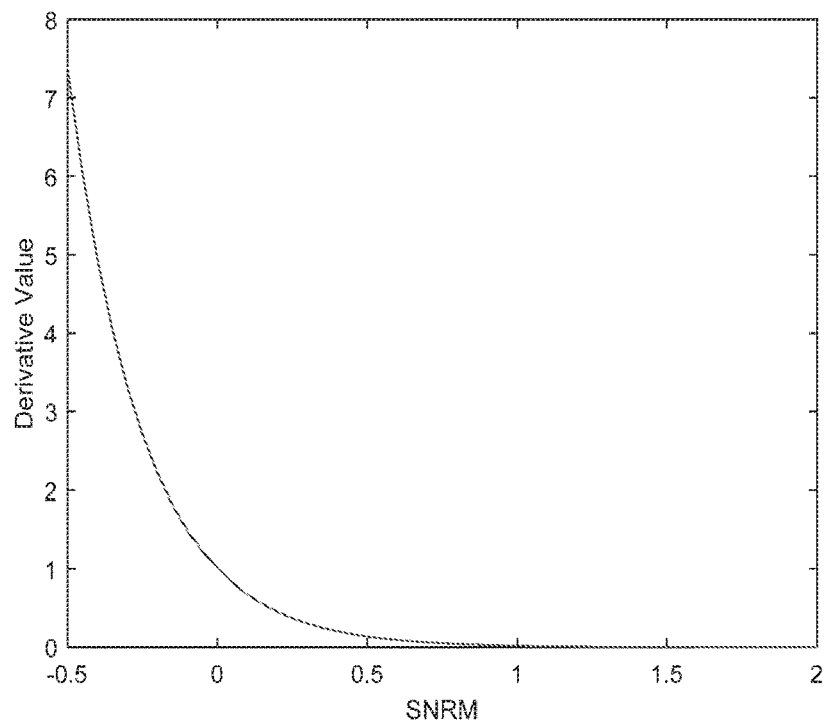
FIG. 4 illustrates a first derivative of the example concave value function.

An arbitrary concave value function $f$ is introduced that takes as its argument the excess margin $SNR_M[i]$ on the channel i as determined at the receiver modem. A positive value for $SNR_M[i]$ indicates that total SNR (including ASE, nonlinear effects, and internal receiver modem noise) currently experienced by the channel i exceeds the SNR required for error-free communications on that channel. A negative value for $SNR_M[i]$ indicates that the total SNR currently experienced by the channel i is less than the SNR required for error-free communications on that channel. The concave value function $f(SNR_M[i])$ expresses the utility of extra margin on a channel and whether the channel is better off sharing its excess margin. FIG. 3 illustrates an example concave value function $f$ having desirable properties, and FIG. 4 illustrates a first derivative $f^1$ of the example concave value function. It is scaled so that $f(0)=0$ and $f^1(0)=1$. The example concave value function $f$ is neutral (has a value of zero) for zero excess margin, decreases rapidly for negative excess margin, and increases then quickly plateaus for positive excess margin.

An example objective function $V_2$ for a section that incorporates information from the receiver modem is the sum over all controllable channels of a concave value function $f$ of the excess margin, as given in Equations (12) and (13):

$$V_2 = \sum_{i=1}^{N_{CH}} C[i]D[i]f(SNR_M[i]) \quad (12)$$

$$SNR_M[i] = -10\log\left(\frac{LNSR_M[i]}{BLNSR_M[i]}\right) \quad (13)$$

In Equation (12), C[i] is a customer-defined weighting value for the channel i to optionally bias the objective function for particular higher-value signals. D[i] is a metric that is a function of the geographic distance travelled by the channel i from the transmitter to the receiver, or other such network value. Adjusting the function for D allows an adaptation of the trade-off between the use of an optical fiber (if optical fiber on this route is a scarce resource and installing or acquiring rights to more would be very expensive, then, for example, set D[i]=1), and minimizing the cost of the transceivers (if optical fiber is plentiful, then, for example, set D[i]=distance[i]).

In Equation (13), $LNSR_M[i]$ is the line NSR for the channel i as measured at the receiver modem, and $BLNSR_M[i]$ is a budgeted line NSR which factors in margin, implementation noise, and target Required Noise to Signal Ratio (RNSR), required for the modem to be error free under nominal conditions, from the capacity commitment and forward error channel (FEC) performance for the channel i.

There are many different ways in which the budgeted line NSR for the channel i, $BLNSR_M[i]$, can be defined. For example, the budgeted line NSR may be defined as given in Equation (14):

$$BLNSR_M[i] = \frac{1}{m_P}(\text{FEC\_NSR}[i] - INSR[i] - m_A) \quad (14)$$

In Equation (14), FEC_NSR[i] is the NSR for the modulation format for the channel i at the FEC threshold, INSR[i] is the modem implementation noise for the channel i, $m_p$ is a multiplicative margin applied to the line NSR, and $m_A$ is an additive noise margin.

The example objective function $V_2$ given in Equation (12) can be expressed as the sum over all channels i of an example channel objective function $V_2[i]$, which is given in Equation (15):

$$V_2[i]=C[i]D[i]f(SNR_M[i]) \quad (15)$$

The partial derivative of the example channel objective function $V_2[i]$ with respect to channel power for channel i in the span j of optical fiber is given by Equations (16), (17) and (18):

$$\frac{\partial V_2[i]}{\partial P_j[i]} = A[i]\frac{\partial}{\partial P_j[i]}\left(\sum_{j=1}^{N} LNSR_j[i]\right) = A[i]\frac{\partial LNSR_j[i]}{\partial P_j[i]} \quad (16)$$

$$A[i] = \frac{-10C[i]D[i]f^1(SNR_M[i])}{2.30 LNSR_M[i]} \quad (17)$$

$$LNSR_M[i] = \sum_{j=1}^{N} LNSR_j[i] \quad (18)$$

Equations (16) and (17) demonstrate the use of the chain rule in the partial derivative, and introduce the concept of a modem coefficient $A[i]$ that encapsulates receiver modem information. The modem coefficient $A[i]$ multiplies the partial derivative of the noise (LNSR) to power ratio of a specific section.

Through proper scaling of the metric $D[i]$, the modem coefficient $A[i]$ can be made equal to the first derivative of the example concave value function $f$: $A[i]=f^1(SNR_M[i])$. The receiver modem whose channel i traverses the section is capable of determining the value of the modem coefficient $A[i]$. For channels where receiver modem information is unavailable, the modem coefficient $A[i]$ can be set to equal the number 1.

The value of this proper scaling of the metric $D[i]$ is to ground the example concave value function $f$ of measured margin onto the example objective function $V_1$ given in Equation (1) which can be shown to either maximize capacity or the capacity-product depending on the choice of the weighting value $C[i]$. When the modem coefficient $A[i]$ is set to equal the number 1 for all channels, the derivative in Equation (16) for the example objective function $V_2$ is identical to the derivative in Equation (4) for the example objective function $V_1$. Thus the example concave value function $f$ which tends to help channels with less margin at the expense of channels with more margin will operate around the control parameters that are close to either maximizing capacity or the capacity-distance product of the optical network.

The following discussion derives the gradients of the example objective function $V_2$, which are evaluated to provide a direction for adjustment of control parameters. A gradient vector $\nabla V_{2,1}$ for control of the ingress WSS node 12 is derived. A gain gradient for TOP control of the optical amplifier devices 18 is derived.

By comparing Equation (16) and Equation (3), it is apparent that the gradients derived for the example objective function $V_1$ are applicable to the example objective function $V_2$, with the insertion of the modem coefficient $A[i]$. In cases where the modem coefficient $A[i]$ equals 1 for all channels, the gradients derived for the example objective function $V_1$ are identical to the gradients derived for the example objective function $V_2$.

The partial derivative of the example function $V_2$ with respect to WSS loss for the channel k in the section is therefore given by Equation (19):

$$\frac{\partial V_2}{\partial P[k]} = \sum_{j=1}^{N}\left[-A[i]C[k]\frac{ASE_j[k]}{e^{P_j[k]}} + \sum_{k=1}^{N_{CH}} 2A[i]C[k]NL_j[i,k]e^{2P_j[i]}\right] \quad (19)$$

where $A[i]=f^1(SNR_M[i])$.

A gradient vector $\nabla V_2$ for the section comprises the partial derivative $\partial V_2/\partial P[k]$ for each channel k from 1 to $N_{CH}$. The gradient vector $\nabla V_2$ can be evaluated from the modem coefficients $A[i]$, the customer values $C[i]$, the known characteristics $NL_j[i,k]$, and the measured or estimated data $\{P_j[i]\}$ and $\{ASE_j[i]\}$.

The gain gradient for the span j of optical fiber, averaged over all wavelengths, can be formed as given by Equation (20):

$$\frac{\partial V_{2j}}{\partial G_j} = \sum_{k=1}^{N_{CH}}\left[-A[i]C[k]\frac{ASE_{j+1}[k]}{e^{P_{j+1}[k]}} + \sum_{i=1}^{N_{CH}} 2A[i]C[i]NL_j[i,k]e^{2P_j[i]}\right] \quad (20)$$

where $A[i]=f^1(SNR_M[i])$.

The gain gradient for the optical amplifier device j, averaged over all wavelengths, can be evaluated from the modem coefficients $A[i]$, the customer values $C[i]$, the known characteristics $NL_j[i, k]$, and the measured or estimated data $\{P_j[i]\}$ and $\{ASE_j[i]\}$.

The values of the gradients are used in steepest descent algorithms to adjust control parameters of the section by a small step in a direction of optimization of the objective function.

Small adjustments are applied to loss values of a WSS node and to target TOP values of optical amplifier devices. The steepest descent algorithm is applied to the WSS node while assuming that the gains of the optical amplifier devices are fixed. The steepest descent algorithm is applied to all of the optical amplifier devices in parallel while assuming that the WSS pixel drive values are fixed.

For example, two loops may be run in parallel with a decoupling factor, as expressed in the vector Equation (21), Equation (22) and Equation (23):

$$\text{WSS\_PowerTarget}_{NEW} = \text{WSS\_PowerTarget} - \left(\frac{MAXSTEP}{\max(\nabla V_2)} * [\nabla V_2 - \text{mean}(\nabla V_2)]\right) \quad (21)$$

$$\text{TOP\_Target}_{NEW} = \text{TOP\_Target} - \text{sign}\left[\frac{\partial V_{2j}}{\partial G_j} * 0.1 * MAXSTEP\right] \quad (22)$$

if $\text{TOP\_Target}_{NEW} \geq TOP_{LIMIT}$, set $\text{TOP\_Target}_{NEW} = TOP_{LIMIT}$ (23)

where $\text{WSS\_PowerTarget}_{NEW}$ and WSS_PowerTarget have values for each channel k from 1 to $N_{CH}$, the decoupling factor in this example is 0.1, and the target TOP for the optical amplifier device j is subject to an upper limit. An example MAXSTEP is 0.2 dB.

TOP control is used to decouple incremental SNR optimization in this section from changes occurring other sections of the optical fiber network. The subtraction of the change in average power (which is denoted mean($\nabla V_2$) in Equation (21) but is not quite equal to the average of the changes) keeps the WSS output power constant, and the power launched into the first span is controlled by the TOP of the first amplifier. This scaling is important when one or more of the amplifiers reaches the limit of their TOP and can provide no more power. With this scaling, the allocation of that limited power between the wavelengths is cleanly optimized.

Note also that there is no reliance on a second derivative for step size, and that this simple algorithm is robust to noise.

When the ability for rapid introduction of new channels is desired, idlers may be used to pre-allocate the effects of those channels.

An ASE idler is treated by the first aspect (example objective function $V_1$) as any other channel, with the appropriate XPM generator coefficient. The channel weight could be set to a static value of one. In the second aspect (example objective function $V_2$), once a modem signal is switched to replace this ASE, then the margin from that modem would be used to calculate the new weight in the usual way. The diminished default value is used again after the ASE is switched back in.

To not cause the XPM from ASE idlers, a limited number of virtual idlers can be used. Virtual idlers are treated just like ASE idlers, except that their XPM generator coefficient is set to equal that of the modulation expected to be used. Virtual idlers do not consume photons, so the TOP limits need to be reduced by the virtual wattage.

A Boolean acceptance criteria should be used to decide on the choice of a virtual idler versus an ASE idler in order to limit the SRS impact of their sudden conversion to real signals, assuming that all virtual idlers are allowed to switch at once. Define A to be the integral of virtual power spectral density out of the WSS, across a 1 THz interval centered at the wavelength of the candidate virtual idler, including the virtual power of that candidate idler. Define B to be the integral of real power spectral density across the same 1 THz interval centered at the wavelength of the candidate virtual idler. Choose epsilon to be a small positive number to avoid division by zero, e.g. 100 microWatts. The virtual idler is acceptable if A/(B+epsilon)<0.25.

In yet another aspect, the objective function is a combination of the above two objective functions. For example, the example objective function is given by Equation (24):

$$V_3 = V_2 - V_1 = \Sigma_{i=1}^{NCH} C[i]D[i]f(SNR_M[i]) - \Sigma_{i=1}^{NCH} C[i] LNSR[i] \quad (24)$$

With this example objective function $V_3$, the goal of the objective function is to balance the goals of minimizing the total degradation through the section with maximizing capacity or reliability or both of the optical fiber network by re-allocating margin among the channels that are propagated through the section. The discussion above of deriving gradients and applying the gradients in steepest descent algorithms is applicable also to the example objective function $V_3$.

Returning now to FIG. 2, consider how this example section 10 could be modified to independently amplify different bands of transmission. For example, the section 10 could simultaneously handle the C band (1525 nm to 1565 nm) and the L band (1565 nm to 1610 nm). The ingress WSS node 12 could have two independent WSS filters to control individual channel powers for the C band and the L band, respectively. Each of the optical (pre-)amplifier devices 18,20 could be replaced by a set of two optical (pre-)amplifier devices, one for the C band and one for the L band. The C-band channels and the L-band channels propagate through the same spans 16 of optical fiber, where there is fiber nonlinear interaction between all the channels. That is, the nonlinear interaction in the spans of optical fiber is across all channels being propagated, including C-band channels and L-band channels. There is also strong SRS which makes for significant power differences between channels compared to the case of a single band, given that the SRS is approximately proportional to the square of the optical bandwidth.

In a variation of the first aspect, the example objective function $V_1$ applies to the full set of channels in the C band and the L band.

The partial derivative of the example objective function $V_1$ with respect to C-band WSS loss for the channel k in the section is given by Equation (25), where the channel k is in the C band:

$$\frac{\partial V_1}{\partial P[k]} = \sum_{j=1}^{N} \frac{\partial V_{1j}}{\partial P_j[k]} = \sum_{j=1}^{N} \left[ -C[k]\frac{ASE_j[k]}{e^{P_j[k]}} + \sum_{i=1}^{N_{CH}} 2C[k]NL_j[i,k]e^{2P_j[i]} \right] \quad (25)$$

where P[k] is the power of the channel k out of the ingress WSS node 12 which affects all spans in the section.

The partial derivative of the example objective function $V_1$ with respect to L-band WSS loss for the channel k in the section is given by Equation (26), where the channel k is in the L band:

$$\frac{\partial V_1}{\partial P[k]} = \sum_{j=1}^{N} \frac{\partial V_{1j}}{\partial P_j[k]} = \sum_{j=1}^{N} \left[ -C[k]\frac{ASE_j[k]}{e^{P_j[k]}} + \sum_{i=1}^{N_{CH}} 2C[k]NL_j[i,k]e^{2P_j[i]} \right] \quad (26)$$

where P[k] is the power of the channel k out of the ingress WSS node 12 which affects all spans in the section.

In Equation (25), the summation of the nonlinear interaction is over all $N_{CH}$ channels i in the C band and in the L band. In Equation (26), the summation of the nonlinear interaction is over all $N_{CH}$ channels i in the C band and in the L band.

A gradient vector $\nabla V_1(C)$ for the section for the C band comprises the partial derivative $\partial V_1/\partial P[k]$ for each channel k in the C band from 1 to $N_{CH}^C$. A gradient vector $\nabla V_1(L)$ for the section for the L band comprises the partial derivative $\partial V_1/\partial P[k]$ for each channel k in the L band from 1 to $N_{CH}^L$. The gradient vectors $\nabla V_1(C)$ and $\nabla V_1(L)$ can be evaluated from the customer values C[i], the known characteristics $NL_j[i, k]$, and the measured or estimated data $\{P_j[i]\}$ and $\{ASE_j[i]\}$.

The gain gradient for the optical amplifier device j, averaged over all wavelengths in the C band, can be formed as given by Equation (27):

$$\frac{\partial V_{1j}(C)}{\partial G_j} = \sum_{k=1}^{N_{CH}^C} \left[ -C[k]\frac{ASE_{j+1}[k]}{e^{P_{j+1}[k]}} + \sum_{i=1}^{N_{CH}} 2C[i]NL_j[i,k]e^{2P_j[i]} \right] \quad (27)$$

where the outer summation is over the channels k in the C band, and the inner summation is over all $N_{CH}$ channels i in the C band and the L band.

The gain gradient for the optical amplifier device j, averaged over all wavelengths in the L band, can be formed as given by Equation (28):

$$\frac{\partial V_{1j}(L)}{\partial G_j} = \sum_{k=1}^{N_{CH}^L}\left[-C[k]\frac{ASE_{j+1}[k]}{e^{P_{j+1}[k]}} + \sum_{i=1}^{N_{CH}} 2C[i]NL_j[i,k]e^{2P_j[i]}\right] \quad (28)$$

where the outer summation is over the channels k in the L band, and the inner summation is over all $N_{CH}$ channels i in the C band and the L band. The total number of channels in the C band and the L band, denoted $N_{CH}$, is the sum of the number of channels in the C band, denoted $N_{CH}^C$, and the number of channels in the L band, denoted $N_{CH}^L$. That is, $N_{CH}=N_{CH}^C+N_{CH}^L$.

The gain gradients can be evaluated from the customer values C[i], the known characteristics $NL_j[i, k]$, and the measured or estimated data $\{P_j[i]\}$ and $\{ASE_j[i]\}$.

Small adjustments are applied to loss values of a WSS node and to target TOP values of optical amplifier devices. The steepest descent algorithm is applied to the WSS node while assuming that the gains of the optical amplifier devices are fixed. The steepest descent algorithm is applied to all of the optical amplifier devices in parallel while assuming that the WSS pixel drive values are fixed.

For example, four loops may be run in parallel with a decoupling factor, as expressed in the vector Equations (29) and (30), Equations (31) and (32) and Equations (33) and (34):

$$\text{WSS\_PowerTarget}_{NEW}(C) = \text{WSS\_PowerTarget}(C) - \left(\frac{MAXSTEP}{\max(\nabla V_1(C))} * [\nabla V_1(C) - \text{mean}(\nabla V_1(C))]\right) \quad (29)$$

$$\text{WSS\_PowerTarget}_{NEW}(L) = \text{WSS\_PowerTarget}(L) - \left(\frac{MAXSTEP}{\max(\nabla V_1(L))} * [\nabla V_1(L) - \text{mean}(\nabla V_1(L))]\right) \quad (30)$$

$$\text{TOP\_Target}_{NEW}(C) = \text{TOP\_Target}(C) - \text{sign}\left[\frac{\partial V_{1j}(C)}{\partial G_j} * 0.1 * MAXSTEP\right] \quad (31)$$

if $\text{TOP\_Target}_{New}(C) \geq TOP_{LIMIT}(C)$, \quad (32)
set $\text{TOP\_Target}_{NEW}(C) = TOP_{LIMIT}(C)$ $$\text{TOP\_Target}_{NEW}(L) = \text{TOP\_Target}(L) - \text{sign}\left[\frac{\partial V_{1j}(L)}{\partial G_j} * 0.1 * MAXSTEP\right] \quad (33)$$

if $\text{TOP\_Target}_{NEW}(L) \geq TOP_{LIMIT}(L)$, \quad (34)
set $\text{TOP\_Target}_{NEW}(L) = TOP_{LIMIT}(L)$ where $\text{WSS\_PowerTarget}_{NEW}(C)$ and WSS_PowerTarget (C) have values for each channel k in the C band from 1 to $N_{CH}^C$, $\text{WSS\_PowerTarget}_{NEW}(L)$ and WSS_PowerTarget (L) have values for each channel k in the L band from 1 to $N_{CH}^L$, the decoupling factor in this example is 0.1, and the target TOP for the optical amplifier device is subject to an upper limit (dependent on the band). An example MAXSTEP is 0.2 dB.

In a variation of the second aspect, the example objective function $V_2$ applies to the full set of channels in the C band and the L band. Similar equations and loops can be derived for that case, for example, by replacing the customer values C[i] in Equations (25) through (34) with the product of the customer values C[i] and the modem coefficients A[i].

For clarity, the examples apply a Gaussian nonlinearity noise model. The methods described in the document can be used where other models of optical nonlinear interactions provide a better representation, such as where the nonlinearities are not substantially independent between spans.

For clarity, the examples use ASE from Erbium doped fiber amplifiers (EDFAs). Other power or gain dependent degradations such as double-Raleigh scattering from Raman amplifiers may be included in the estimations.

Modern high capacity optical transmission systems use coherent modems (also known as coherent transceivers). The techniques described in this document may also be used with other kinds of optical transmitters and receivers.

The description shows specific examples of objective functions and the derivation of control algorithms from those objective functions. Other objective functions may be used. Using a convex objective function and deriving a control algorithm from an objective function is convenient. However, other control algorithms and methods may be used.

For simplicity, the control algorithms described in this document have sole control of the control parameters of the section. Other control algorithms or provisioning or constraints may also be present or active.

The scope of the claims should not be limited by the details set forth in the examples, but should be given the broadest interpretation consistent with the description as a whole.

What is claimed is:

1. An apparatus comprising:
   circuitry to support an optical service channel; and
   a processor configured
      to evaluate gradients of an objective function using measurements of optical signals in a section of an optical fiber network and using estimated data derived from the measurements and from knowledge of the section, wherein the estimated data is a function of optical nonlinearity and of amplified spontaneous emission; and
      to apply one or more control algorithms using at least the gradients to adjust one or more control parameters of the section,
      wherein application of the one or more control algorithms to adjust the one or more control parameters comprises adjusting the one or more control points in a direction of one or more dimensions of those gradients.

2. The apparatus as recited in claim 1, wherein the processor is a shelf processor.

3. The apparatus as recited in claim 1, wherein the apparatus comprises wavelength selective switch (WSS) functionality.

4. The apparatus as recited in claim 1, wherein the apparatus comprises an optical amplifier device.

5. The apparatus as recited in claim 1, wherein the measurements include a total output power.

6. The apparatus as recited in claim 1, wherein the measurements include per-channel optical power or power spectral density.

7. The apparatus as recited in claim 6, wherein the measurements of per-channel optical power or power spectral density are taken at fewer geographic locations than a number of geographic sites in the section having optical amplifier devices.

8. The apparatus as recited in claim 1, wherein the control parameters include per-channel power control.

9. The apparatus as recited in claim 8, wherein the control parameters include loss values of a wavelength selective switch (WSS) node in the section.

10. The apparatus as recited in claim 1, wherein the control parameters include total power control.

11. The apparatus as recited in claim 1, wherein the control parameters include per-channel power control and total power control, and the control algorithm to adjust per-channel power control is substantially decoupled from the control algorithm to adjust total power control.

12. The apparatus as recited in claim 1, wherein the estimated data includes estimated per-channel optical power or estimated power spectral density at the output of one or more optical amplifier devices in the section.

13. The apparatus as recited in claim 1, wherein the optical signals comprise two or more bands of channels that are independently amplified through the section, and optimization of the objective function jointly optimizes over all channels of the two or more bands.

14. The apparatus as recited in claim 13, wherein the objective function is configured to minimize degradations through the section.

15. The apparatus as recited in claim 14, wherein optimization of the objective function minimizes a weighted sum of ratios of the total noise power from amplified spontaneous emission and optical nonlinearities to the power of the optical signals.

16. The apparatus as recited in claim 1, wherein the objective function is configured to maximize capacity or reliability or both of the optical fiber network by reallocating margin between channels.

17. The apparatus as recited in claim 16, wherein the objective function incorporates a concave value function of margin of one or more channels propagated through the section.

18. The apparatus as recited in claim 1, wherein the optical fiber network comprises multiple sections, and multiple instances of the one or more control algorithms operate in parallel.

* * * * *

UNITED STATES PATENT AND TRADEMARK OFFICE
CERTIFICATE OF CORRECTION

PATENT NO. : 10,236,981 B2
APPLICATION NO. : 15/648895
DATED : March 19, 2019
INVENTOR(S) : James Harley, Kim B. Roberts and David Boertjes Page 1 of 1

It is certified that error appears in the above-identified patent and that said Letters Patent is hereby corrected as shown below:

In the Specification

At Column 9, Line 14, equation (10) should read:

$$\text{TOP\_Target}_{NEW} = \text{TOP\_Target} - \text{sign}\left[\frac{\partial V_{1j}}{\partial G_j}\right] * 0.1 * MAXSTEP \qquad (10)$$

At Column 12, Line 50, equation (22) should read:

$$\text{TOP\_Target}_{NEW} = \text{TOP\_Target} - \text{sign}\left[\frac{\partial V_{2j}}{\partial G_j}\right] * 0.1 * MAXSTEP \qquad (22)$$

At Column 15, Line 42, equation (31) should read:

$$\text{TOP\_Target}_{NEW}(C) = \text{TOP\_Target}(C) - \text{sign}\left[\frac{\partial V_{1j}(C)}{\partial G_j}\right] * 0.1 * MAXSTEP \qquad (31)$$

At Column 15, Line 50, equation (33) should read:

$$\text{TOP\_Target}_{NEW}(L) = \text{TOP\_Target}(L) - \text{sign}\left[\frac{\partial V_{1j}(L)}{\partial G_j}\right] * 0.1 * MAXSTEP \qquad (33)$$

Signed and Sealed this
Sixteenth Day of July, 2019

Andrei Iancu
*Director of the United States Patent and Trademark Office*